United States Patent
Knoll

(10) Patent No.: US 9,408,461 B2
(45) Date of Patent: Aug. 9, 2016

(54) STORAGE SYSTEM

(71) Applicant: Target Brands, Inc., Minneapolis, MN (US)

(72) Inventor: Mitchell Knoll, Eagan, MN (US)

(73) Assignee: Target Brands, Inc., Minneapolis, MN (US)

( * ) Notice: Subject to any disclaimer, the term of this patent is extended or adjusted under 35 U.S.C. 154(b) by 199 days.

(21) Appl. No.: 13/677,930

(22) Filed: Nov. 15, 2012

(65) Prior Publication Data

US 2014/0132130 A1    May 15, 2014

(51) Int. Cl.

| | |
|---|---|
| *A47B 53/02* | (2006.01) |
| *A47B 53/00* | (2006.01) |
| *B65G 1/10* | (2006.01) |
| *E06C 7/18* | (2006.01) |
| *E06C 1/39* | (2006.01) |
| *E06C 9/12* | (2006.01) |
| *E06C 1/397* | (2006.01) |

(52) U.S. Cl.
CPC .................. *A47B 53/02* (2013.01); *A47B 53/00* (2013.01); *B65G 1/10* (2013.01); *E06C 1/39* (2013.01); *E06C 1/397* (2013.01); *E06C 7/183* (2013.01); *E06C 9/12* (2013.01)

(58) Field of Classification Search
CPC ............. E06C 9/12; E06C 1/39; E06C 1/397; E06C 7/183; A47B 53/00; A47B 53/02; B65G 1/10
USPC ............ 312/198–199, 201; 104/106; 52/36.1; 182/36, 38–39; 211/134, 162; 248/210, 248/235, 238, 140, 240.3–240.4, 241, 250
See application file for complete search history.

(56) References Cited

U.S. PATENT DOCUMENTS

| | | | |
|---|---|---|---|
| 356,375 A * | 1/1887 | Perkins | 182/39 |
| 423,962 A * | 3/1890 | Smith | 182/13 |
| 537,186 A * | 4/1895 | Ebert | 182/38 |
| 594,582 A | 11/1897 | Wildprett | |
| 2,166,704 A * | 7/1939 | Foulkes | 312/199 |
| 2,915,195 A * | 12/1959 | Crosby | 312/199 |
| 3,427,085 A * | 2/1969 | Staller | 312/200 |
| 3,729,062 A | 4/1973 | Freiburger | |
| 3,829,189 A | 8/1974 | Staller | |

(Continued)

FOREIGN PATENT DOCUMENTS

CA    2794780 A1    9/2013

OTHER PUBLICATIONS

Office Action from Canadian Patent Application No. 2,813,679, mailed Jun. 25, 2014 (3 pages).

(Continued)

*Primary Examiner* — Daniel J Troy
*Assistant Examiner* — Ryan A Doyle
(74) *Attorney, Agent, or Firm* — Leanne Taveggia Farrell; Westman, Champlin & Koehler, P.A.

(57) ABSTRACT

A storage system includes a plurality of shelves, an aisle and a plurality of ladders. The plurality of shelves includes a pair of fixed shelves and at least one mobile shelf located between the pair of fixed shelves. The aisle is selectively configured to be located between two of the plurality of shelves. The plurality of ladders are spaced apart from and stored at an end of the at least one mobile shelf for slidable access into the aisle. Each ladder engages with a pair of fixed rails that span at least a length of the fixed shelves. A number of ladders correspond with a number of selectively defined aisles.

16 Claims, 8 Drawing Sheets

(56) References Cited

U.S. PATENT DOCUMENTS

| | | | |
|---|---|---|---|
| 3,967,868 A * | 7/1976 | Baker, Jr. | 312/201 |
| 4,615,449 A | 10/1986 | Naito et al. | |
| 4,941,578 A | 7/1990 | Devening | |
| 4,991,725 A | 2/1991 | Welsch et al. | |
| 5,148,889 A | 9/1992 | Fenwick et al. | |
| 5,333,983 A * | 8/1994 | Hatouchi et al. | 414/331.06 |
| 5,411,112 A | 5/1995 | Jephcott | |
| 5,413,191 A * | 5/1995 | Kerr | 182/39 |
| 5,480,002 A | 1/1996 | Kerr | |
| 5,653,307 A | 8/1997 | Kerr | |
| 5,680,942 A | 10/1997 | McAllister et al. | |
| 5,967,346 A | 10/1999 | Price, Jr. | |
| 6,230,841 B1 * | 5/2001 | Valore | 182/39 |
| 6,471,309 B1 | 10/2002 | Turner | |
| 6,619,427 B1 * | 9/2003 | Kerr | 182/39 |
| 7,413,091 B2 | 8/2008 | Krull | |
| 7,757,813 B2 | 7/2010 | Kerr | |
| 7,950,331 B2 * | 5/2011 | Tourdot et al. | 104/108 |
| 8,121,722 B2 | 2/2012 | Tourdot et al. | |
| 2010/0252362 A1 | 10/2010 | Kerr | |
| 2011/0283482 A1 | 11/2011 | Kerr | |
| 2013/0248285 A1 * | 9/2013 | Kerr | 182/36 |

OTHER PUBLICATIONS

Office Action from Canadian Patent Application No. 2,813,679, mailed Sep. 20, 2013 (6 pages).

Office Action from Canadian Patent Application No. 2,813,679, mailed Dec. 2, 2014 (4 pages).

* cited by examiner ary shelves or storage units 106 and 107 and a plurality of
STORAGE SYSTEM

BACKGROUND

Mobile shelving or roller racking systems include moveable storage units designed to offer increased capacity for a given footprint of space. More specifically, storage units within the mobile shelving are mounted on tracks or other type of mechanical system, which allow the storage units to move to create an aisle where needed for access. Allowing the storage units, when not in use, to be side-by-side eliminates the need for aisles to be located between each unit and therefore saves space.

The discussion above is merely provided for general background information and is not intended to be used as an aid in determining the scope of the claimed subject matter.

SUMMARY

A storage system includes a plurality of storage units having a pair of fixed storage units and at least one mobile storage unit located between the pair of fixed storage units. An aisle is selectively configured to be located between two of the plurality of storage units. A plurality of ladders are spaced apart from and stored at an end of the at least one mobile storage unit for slidable access into the aisle. Each ladder engages with a pair of fixed rails that span at least a length of the fixed storage units. A number of ladders correspond with a number of different selective configurations of aisle.

To use the storage system to store or access items, the selectively defined aisle is created between one of the fixed storage units and the mobile storage unit by moving the mobile storage unit relative to the fixed storage unit. A ladder is slid into the aisle along the pair of guide rails that are fixed to a support structure located above and separate from the mobile storage unit.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments described herein include a storage system having a ladder sub-system. The storage system includes a group of storage units including a pair of fixed storage units and at least one moveable storage unit located between the pair of fixed storage units. An aisle is selectively configured to be located between two of the storage units by moving one or more of the storage units relative to one or more other storage units.

The ladder sub-system includes a plurality of ladders with each ladder coupled to a pair of corresponding fixed guide rails located above and separate from the at least one mobile storage unit. In a storage configuration, the ladders are stored in an area that is spaced apart from an end of the plurality of moveable storage units. In a use configuration, each ladder slides along a pair of rails to be moved into the selectively defined aisle so that a user can access portions of the two storage units the aisle is located between. In other words, each ladder rides on a track that is fixed in space and is located above a defined aisle. The defined aisle is an area that opens up between mobile shelving units.

Figure 1:
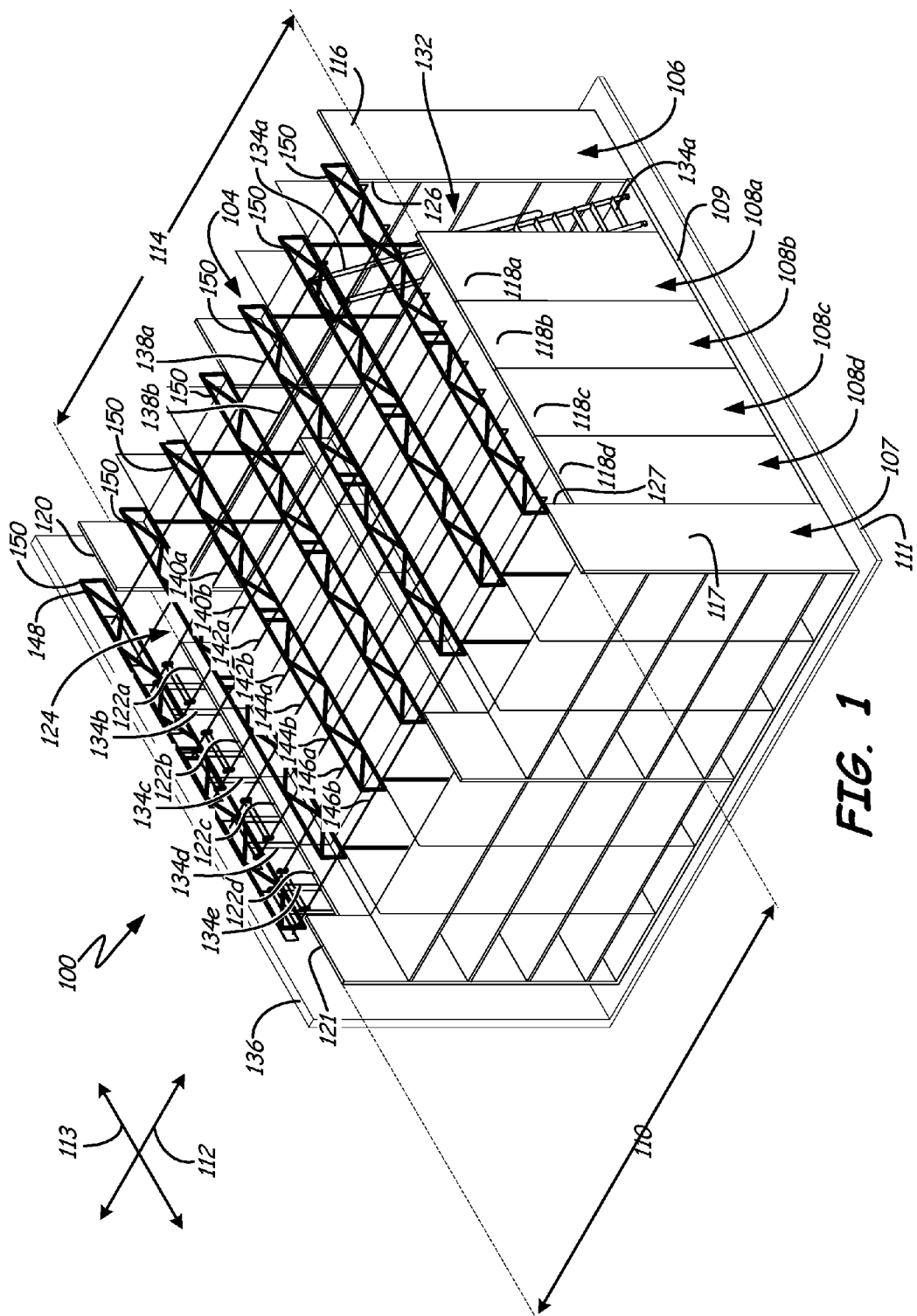
FIG. 1 is a perspective view of one configuration of a storage system according to one embodiment.
Figure 2:
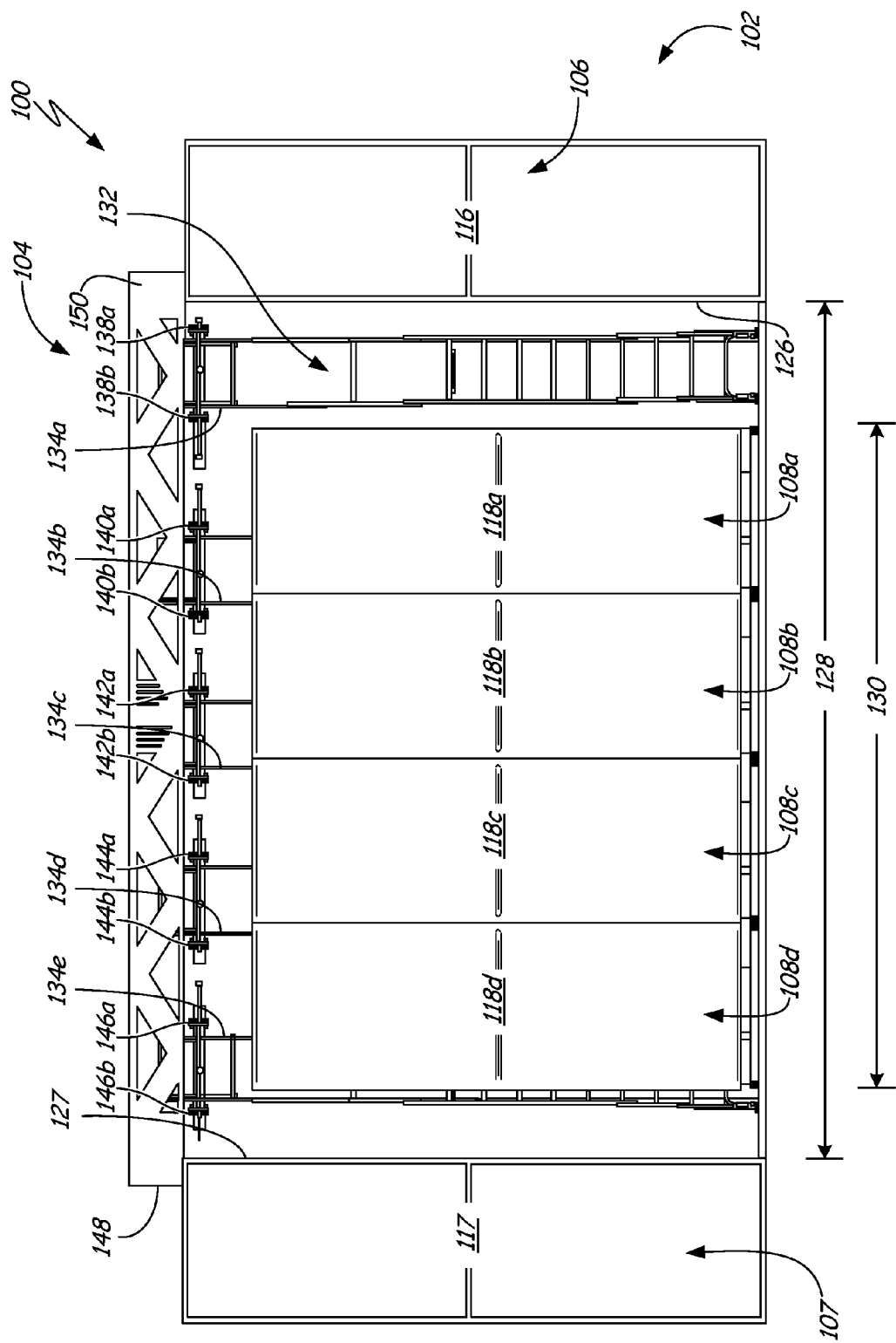
FIG. 2 is a front view of the storage system illustrated in the configuration shown in FIG. 1.

FIG. 1 is a perspective view of one configuration of a storage system 100 according to one embodiment. FIG. 2 is a front view of storage system 100 as illustrated in the configuration shown in FIG. 1. Storage system 100 includes a group of shelves or storage units 102 and a ladder sub-system 104. Other than the configuration illustrated in FIGS. 1 and 2, storage system 100 can be configured into four additional configurations as illustrated in FIGS. 3-7. It should be realized that storage system 100 is not limited to five configurations. Storage system 100 can be configured into more or fewer configurations depending on the number of mobile storage units provided in the group of storage units 102.

According to one exemplary embodiment, the group of shelves or storage units 102 include a pair of fixed or stationary shelves or storage units 106 and 107 and a plurality of mobile shelves or storage units 108a, 108b, 108c and 108d. For example, shelves or storage units 106, 107 and 108a-108d can hold various items including inventory in a backroom of a retail store, inventory in a distribution center of a retail store, books or periodicals in a library, artifacts or memorabilia in a museum or hall of fame, etc.

Mobile storage units 108a-108d are located between the pair of fixed storage units 106 and 107. The pair of fixed storage units 106 and 107 include a length 110 oriented along a longitudinal direction 112. Each of the plurality of mobile storage units 108a-108d include a length 114 oriented along the same longitudinal direction 112. In one embodiment and as illustrated in FIGS. 1-7, length 110 is substantially the same as length 114. However, in other embodiments, length 1114 can be less than length 110.

According to one exemplary embodiment and as illustrated in FIGS. 1-7, because lengths 110 and 114 are substantially the same first ends 116 and 117 of the pair of fixed storage units 106 and 107 and first ends 118a-118d of mobile storage units 108a-108d are located along substantially the same plane and are substantially in alignment with each other and second ends 120 and 121 of the pair of fixed storage units 106 and 107 and second ends 122a-122d of mobile storage units 108a-108d are located along substantially the same plane and are substantially in alignment with each other. Second ends 120 and 121 of the pair of fixed storage units 106 and 107 and second ends 122a-d of mobile storage units 108a-108d are spaced apart from wall 136 to define a storage space 124.

Each of the pair of fixed storage units 106 and 107 include inner facing edges 126 and 127. A distance 128 between the inner facing edges 126 and 127 of fixed shelves or storage units 106 and 107 is greater than a combined width 130 of all mobile storage units 108a-108d. The difference between distance 128 and width 130 is substantially equivalent to a width of an aisle. Therefore, each of mobile storage units 108a-108d is separately moveable in a lateral direction 113 so that an aisle or space 132 can be selectively configured between two adjacent storage units. In one embodiment, a false floor 109 is located below mobile storage units 108a-108d. False floor 109 is raised from the actual floor 111 to accommodate a plurality of tracks 152 (FIG. 5) that are oriented substantially perpendicular to longitudinal direction 112 so that mobile storage units 108a-108d are moveable in lateral direction 113. It should be realized that other ways of moving mobile storage units 108a-108b, other than a floor track system, are contemplated.

Figure 3:
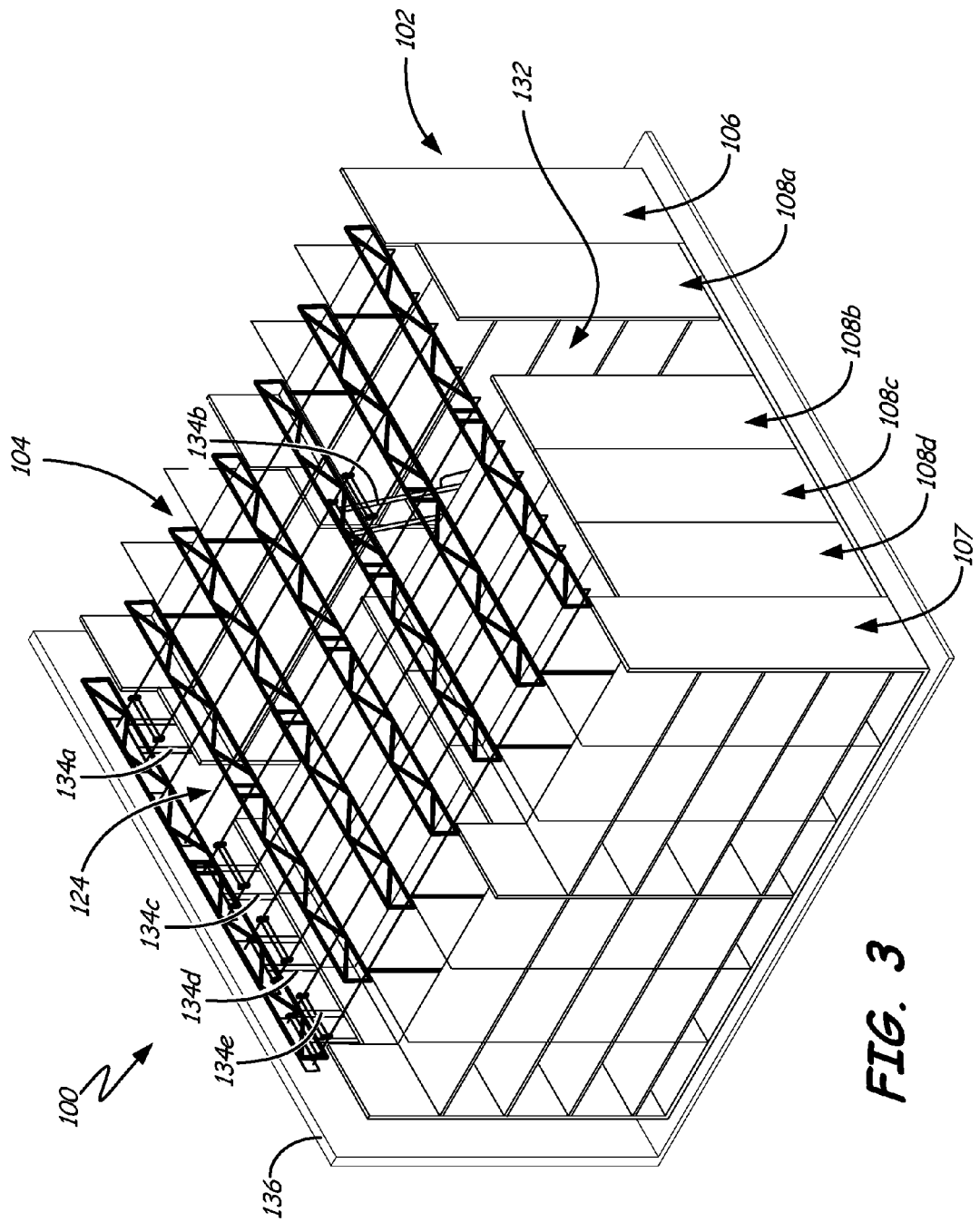
FIG. 3 is a perspective view of another configuration of the storage system illustrated in the FIG. 1.
Figure 4:
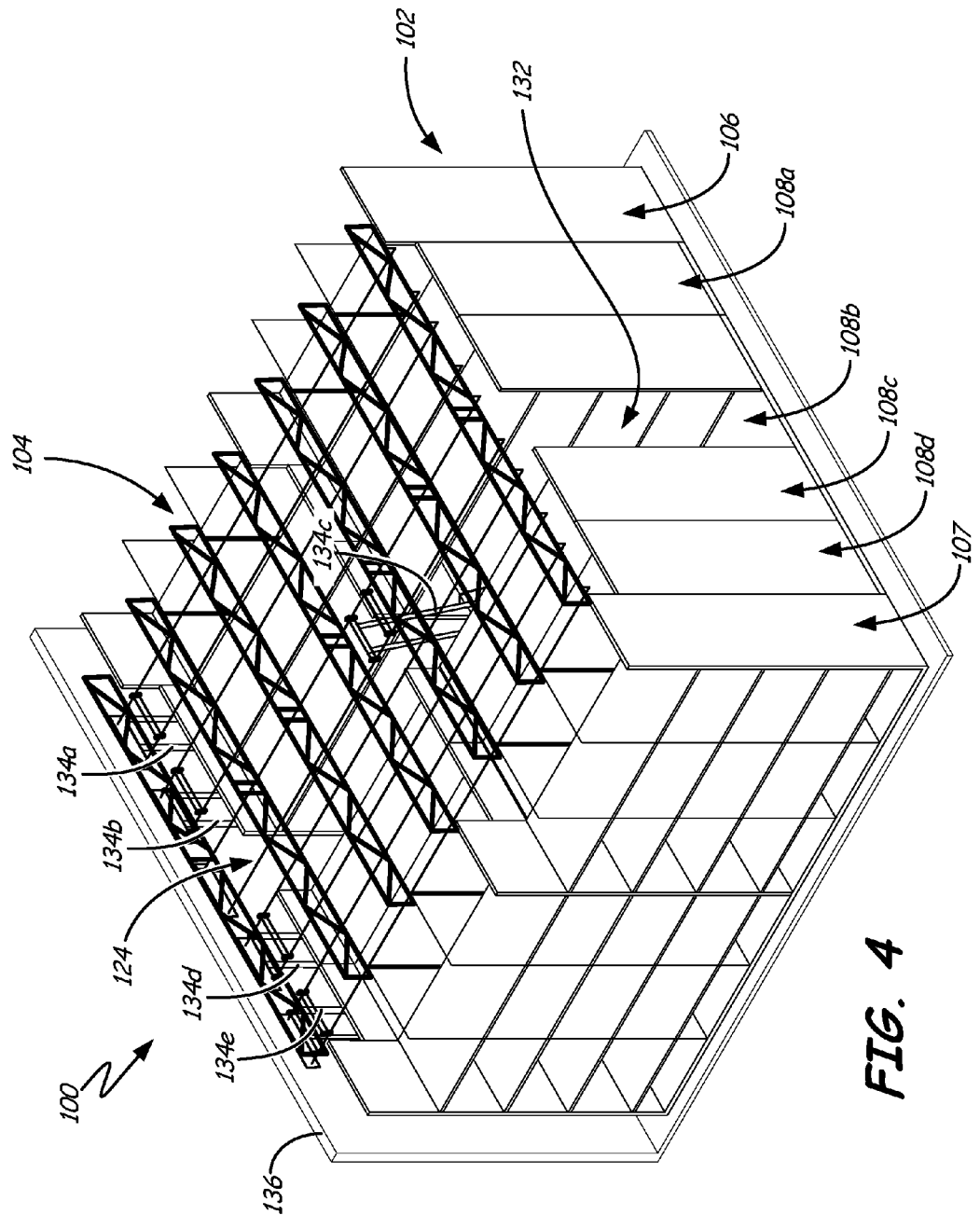
FIG. 4 is a perspective view of yet another configuration of the storage system illustrated in the FIG. 1.
Figure 5:
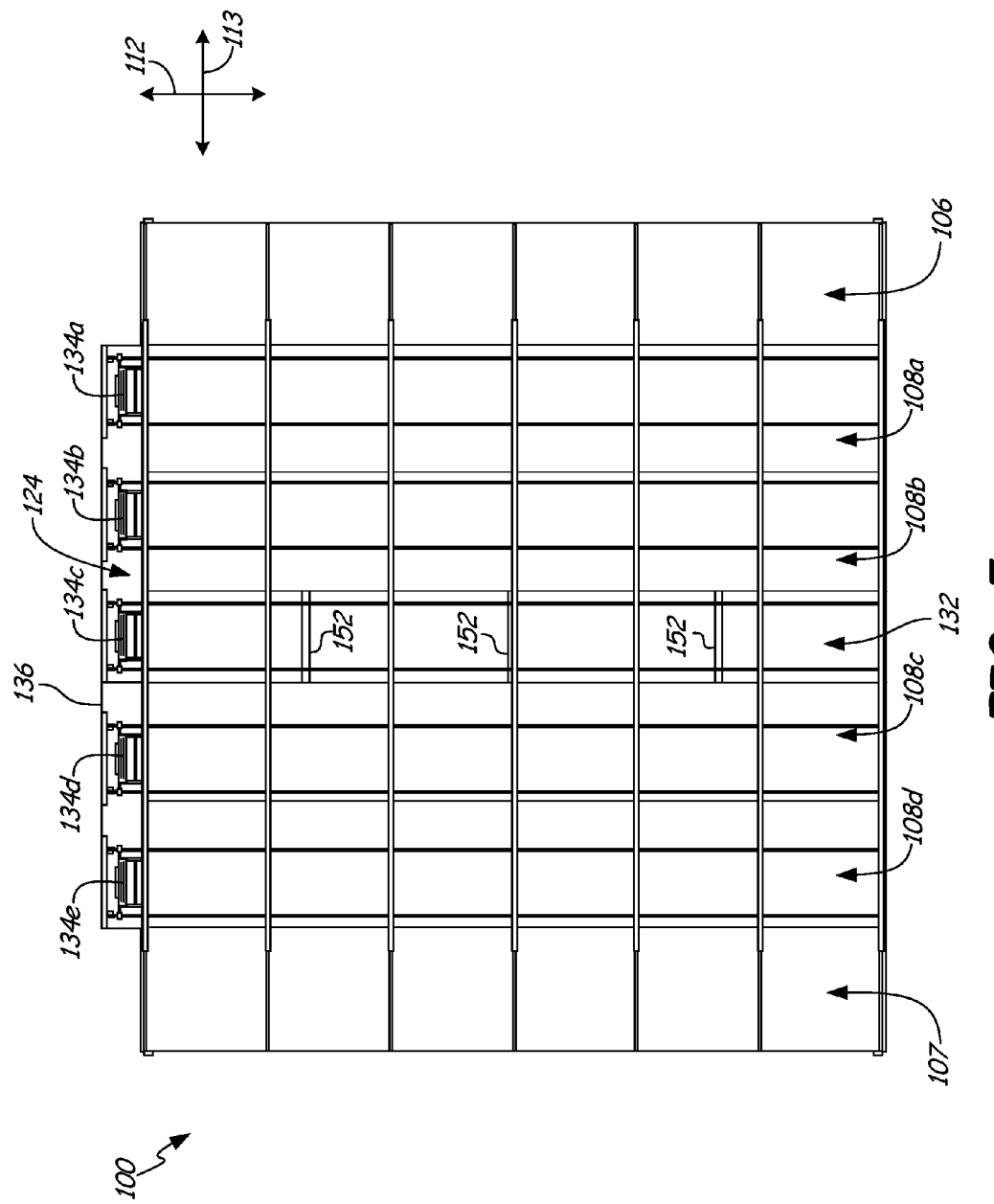
FIG. 5 is a top view of the storage system illustrated in the configuration shown in FIG. 4.
Figure 6:
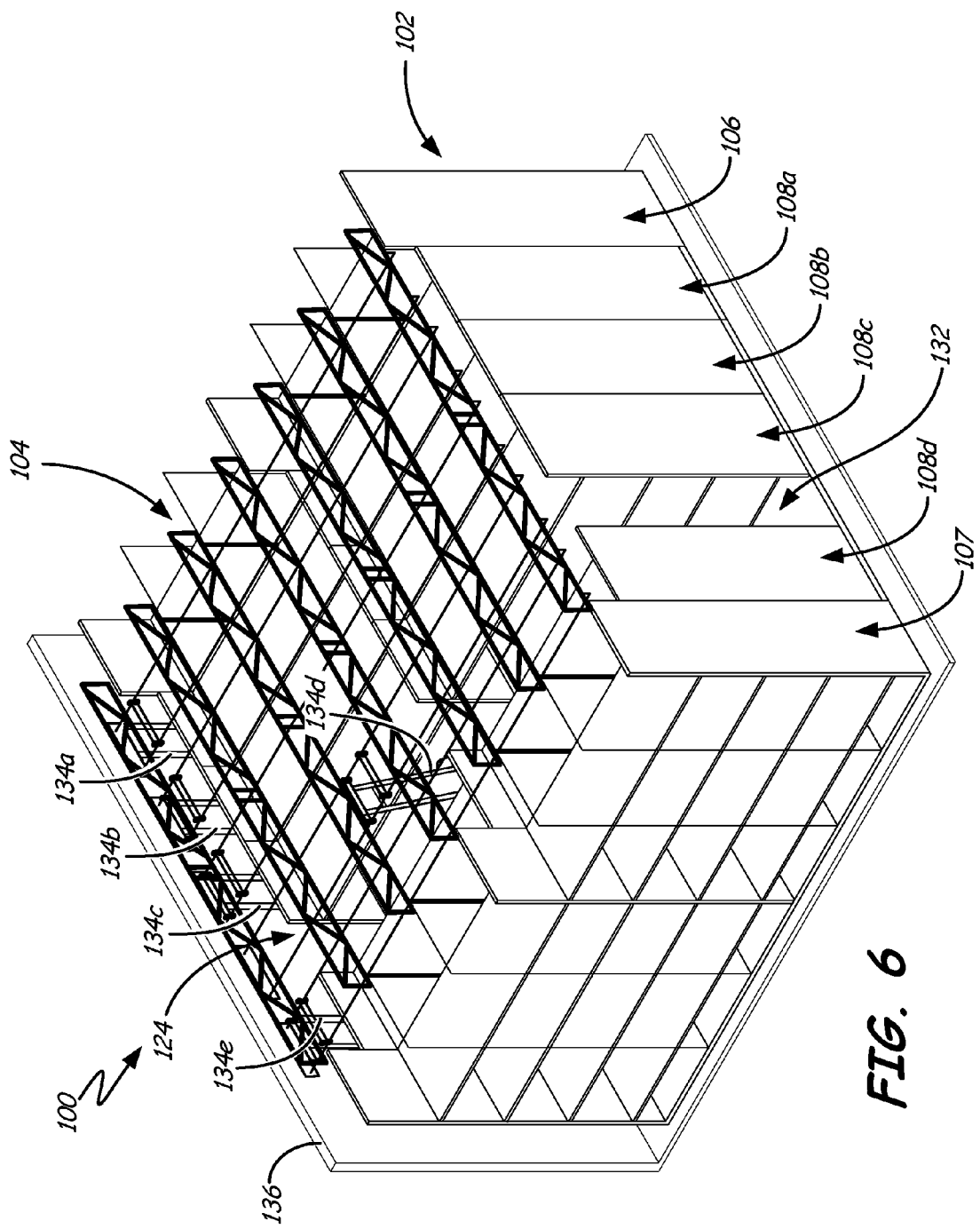
FIG. 6 is a perspective view of yet another configuration of the storage system illustrated in the FIG. 1.
Figure 7:
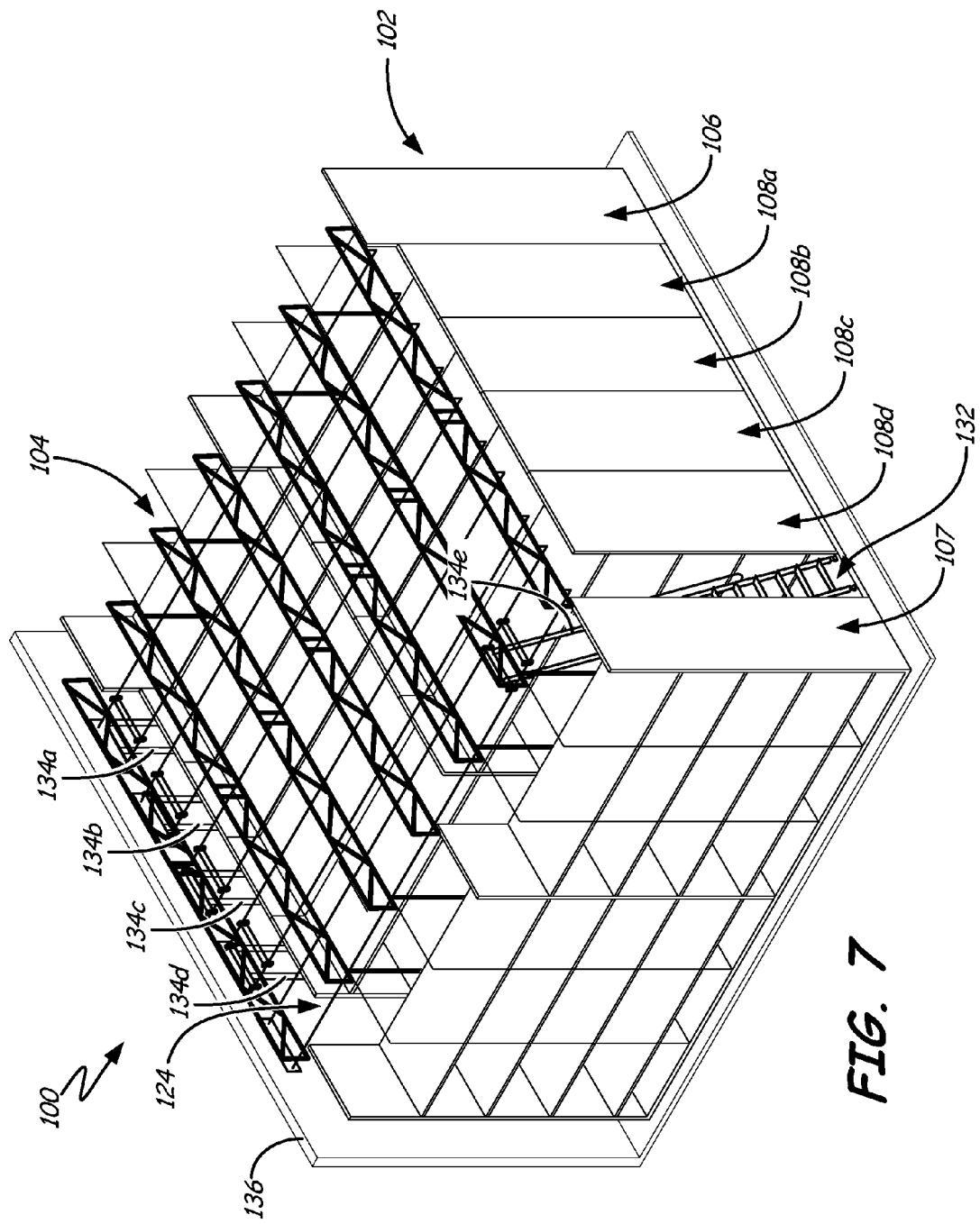
FIG. 7 is a perspective view of yet another configuration of storage system illustrated in the FIG. 1.

As illustrated in FIGS. 1-7, aisle 132 can be configured into a number of different configurations. In FIGS. 1 and 2, aisle 132 is defined between fixed storage unit 106 and the mobile storage unit 108a. In other words, mobile storage unit 108a is moveable relative to fixed storage unit 106 to create aisle or space 132 therebetween. In FIG. 3, aisle 132 is defined between mobile storage unit 108a and mobile storage unit 108b. In other words, to reconfigure aisle 132 from the configuration illustrated in FIGS. 1 and 2 to the configuration illustrated in FIG. 3, mobile storage unit 108a is moveable relative to mobile storage unit 108b to create aisle or space 132 therebetween. In FIGS. 4 and 5, aisle 132 is defined between mobile storage unit 108b and mobile storage unit 108c. In other words, to reconfigure aisle 132 from the configuration illustrated in FIG. 3 to the configuration illustrated in FIGS. 4 and 5, mobile storage unit 108b is moveable relative to mobile storage unit 108c to create aisle or space 132 therebetween. In FIG. 6, aisle 132 is defined between mobile storage unit 108c and 108d. In other words, to reconfigure aisle 132 from the configuration illustrated in FIGS. 4 and 5 to the configuration illustrated in FIG. 6, mobile storage unit 108c is moveable relative to mobile storage unit 108d to create aisle or space 132 therebetween. In FIG. 7, aisle 132 is defined between mobile storage unit 108d and fixed storage unit 107. In other words, to reconfigure aisle 132 from the configuration illustrated in FIG. 6 to the configuration illustrated in FIG. 7, mobile storage unit 108d is moveable relative to fixed storage unit 107 to create aisle or space 132 therebetween. Therefore, aisle 132 is either defined or configured between a fixed storage unit and a mobile storage unit or between two mobile storage units.

The storage system 100 also includes ladder sub-system 104 having a plurality of ladders 134a-134e (FIG. 2) that are spaced apart from second ends 122a-122d of mobile storage units 108a-108d and are located within space 124. Ladders 134a-134e are configured to access or are configured to move into selectively configured aisle 132. The number of ladders 134a-134e in ladder sub-system 104 corresponds with a number of different configurations of aisle 132. For example and in accordance with one embodiment, storage system 100 can be configured to include five different aisles 132. Therefore, storage system 100 includes five different ladders 134a-134e that are stored in space 124. While storage system 100 can include five different aisle configurations or five different ladders 134a-134e, it should be realized that the amount of possible ladders could be greater than or less than five depending on how many aisles 132 can be configured. In addition, the number of aisle configurations is based on how many mobile storage units 108a-108e are located between fixed storage units 106 and 107.

As discussed above, each ladder 134a-134e is stored in storage space 124. In one embodiment, each ladder 134a-134e is stored against a wall 136, which can be spaced apart from second ends 120 and 121 of fixed storage units 106 and 107 and is spaced apart from second ends 122a-122d of mobile storage units 108a-108d as illustrated in FIGS. 1 and 3-7. In one embodiment, each ladder 134a-134e is folded so that the ladder is placed in a substantially vertical orientation and stored flat against wall 136. For example, each ladder 134a-134e can be pushed up or folded up against wall 136 and retained by a bracket that is mounted to the wall. In one example, FIGS. 1 and 2 illustrate ladders 134b, 134c, 134d and 134e folded flat against wall 136. In another example, FIG. 3 illustrates ladders 134a, 134c, 134d and 134e folded flat against wall 136. In yet another example, FIG. 4 illustrates ladders 134a, 134b, 134d and 134e folded flat against wall 136. In still another example, FIG. 5 illustrates ladders 134a-134e folded flat against wall 136. In still another example, FIG. 6 illustrates ladders 134a, 134b, 134c and 134e folded flat against wall 136. In still another example, FIG. 7 illustrates ladders 134a-134d folded flat against wall 136.

The top of each ladder 134a-134e is slidably engaged (such as by rollers, wheels, sliders and the like) with a pair of fixed rails or guide rails that span at least length 110 of fixed storage units 106 and 107, but can span a distance in the longitudinal direction 112 that is longer than length 110 when ladders 134a-134e are stored against wall 136 within space 124. For example, ladder 134a is slidably engaged with fixed rails or guide rails 138a and 138b. Ladder 134b is slidably engaged with fixed rails or guide rails 140a and 140b. Ladder 134c is slidably engaged with fixed rails or guide rails 142a and 142b. Ladder 134d is slidably engaged with fixed rails or guide rails 144a and 144b. Ladder 134e is slidably engaged with fixed rails or guide rails 146a and 146b. In addition, the number of aisle configurations of storage system 100 also corresponds with a number of guide rail pairs. As illustrated in FIGS. 1-7, storage system 100 includes five configurations of aisles 132. Therefore, storage system 100 also includes five pairs of guide rails for each of the five different ladders 134a-134e. Again, it should be realized that the number of guide rail pairs can be greater than or less than five depending on the number of aisle 132 configurations, which, as discussed above, is based on how many mobile storage units 108a-108e are located between fixed storage units 106 and 107.

In one embodiment and during use, each ladder 134a-134e is pulled from wall 136 to both engage the roller, wheels or sliders located on the top of the ladder with the pair of guide rails and to engage the bottom of the ladder, which can include rollers, wheels or sliders, with the floor. The ladder is placed at an angle relative to the floor or relative to the corresponding guide rail pairs to move within a configured aisle 132. In this way, the height of each ladder 134a-134e decreases by being rolled or slid out into the angle to thereby fit under the support structure that supports the guide rails and to run along the guide rails when moved into aisle 132. In an alternative embodiment, the bottom of each ladder may be secured to a longitudinal track that runs along the floor in the space where an aisle can be configured and to which the bottom of the ladder can slide along.

The fixed rails or guide rails 138a, 138b, 140a, 140b, 142a, 142b, 143a, 143b, 144a, 144b, 146a and 146b that support each ladder 134a-134e provide a means for sliding a ladder into and out of a configurable aisle 132 along longitudinal direction 112 and are supported by a support structure 148 located above and separate from at least mobile storage units 108a-108e. Support structure 148 includes a plurality of support members or trusses 150 that are oriented substantially perpendicular to fixed rails or guide rails 138a, 138b, 140a, 140b, 142a, 142b, 143a, 143b, 144a, 144b 146a and 146b. As illustrated in FIGS. 1-4 and 6-7 and according to one embodiment, support structure 148 comprises a plurality of trusses 150. However, as illustrated in the FIG. 8 and according to another embodiment, support structure 248 includes a plurality of support members 250.

Figure 8:
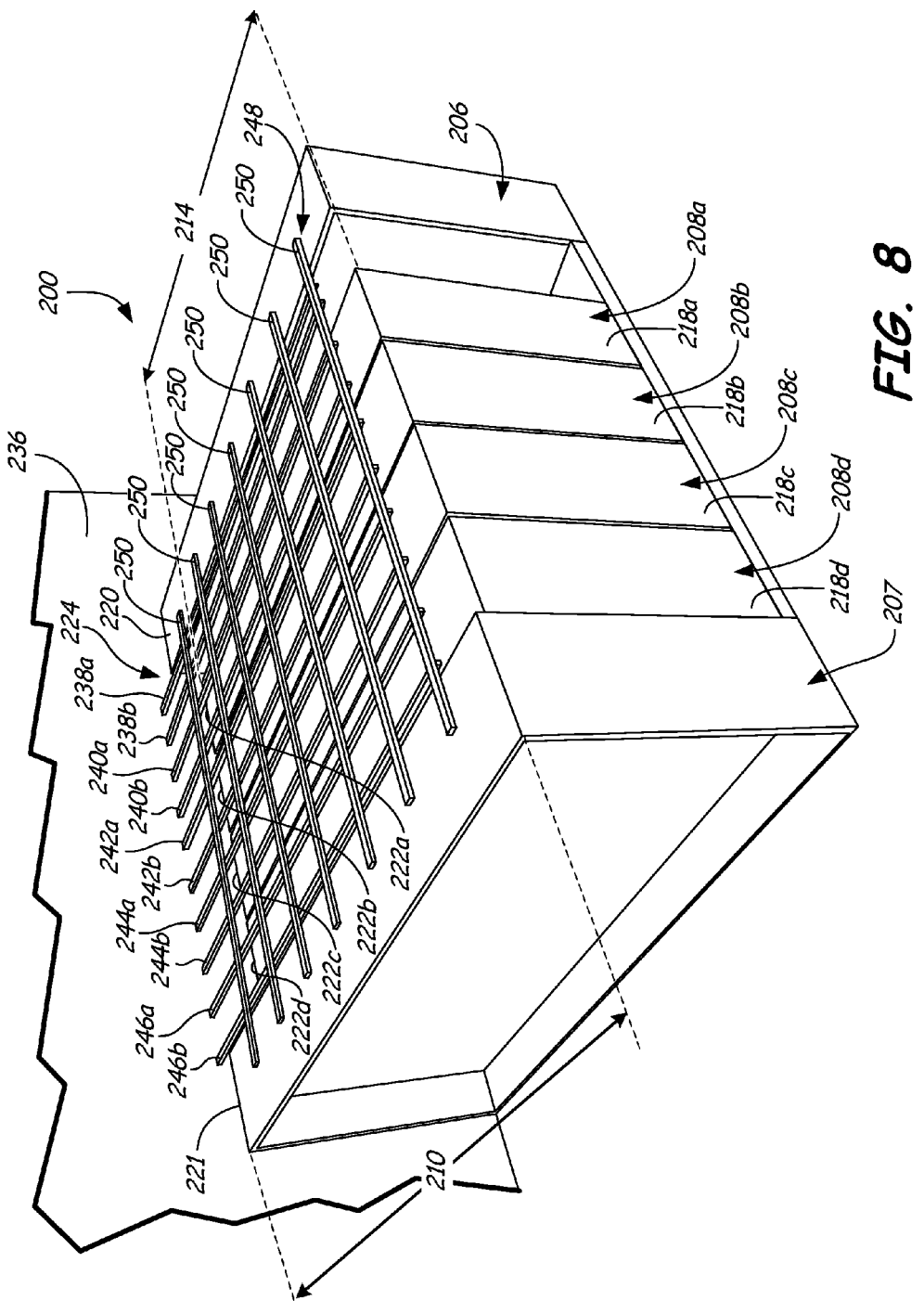
FIG. 8 is a perspective view of one configuration of a storage system according another embodiment.

As illustrated in FIGS. 1-4 and 6-7 and in one embodiment, trusses 150 can be mounted to a ceiling and/or side walls of a backroom retail store environment. In FIG. 8 and in an alternative embodiment, support members 250 are mounted to a top of fixed or stationary storage units 206 and 207. Regardless of how support structure 148 or support structure 248 is secured, it should be realized that support structure 148 and support structure 248 can include other types of support configurations as long as support structures 148 and 248 provide the necessary structural integrity to support fixed rails or guide rails and slidable ladders 134a-134e.

According to one exemplary embodiment and as illustrated in FIG. 8, length 210 of fixed storage units 206 and 207 is greater than length 214 of mobile storage units 218a-218d. More specifically, first ends 216 and 217 of the pair of fixed storage units 206 and 207 and first ends 218a-218d of mobile storage units 208a-208d are located along substantially the same plane and are substantially in alignment with each other and second ends 220 and 221 of the pair of fixed storage units 206 and 207, which abut wall 236, and second ends 222a-222d of mobile storage units 208a-208d are not located in the same plane or in alignment. When length 210 is greater than length 214 and second ends 220 and 221 of fixed storage units 206 and 207 abut wall 236, the difference between lengths 210 and 214 defines a space 224 for storing ladders between wall 236 and ends 222a-222d of mobile storage units 208a-208d.

In addition and as illustrated in the FIG. 8 embodiment, the ends of the guide rails 238a, 238b, 240a, 240b, 242a, 242b, 243a, 243b, 244a, 244b, 246a and 246b can be mounted to wall 236. In this way, ladders can be stored folded or collapsed and placed flat against wall 236 and still be slidably engaged with their corresponding guide rails 238a, 238b, 240a, 240b, 242a, 242b, 243a, 243b, 244a, 244b, 246a and 246b.

With reference back to FIGS. 1-7, in one embodiment of using storage system 100 for either accessing or storing items on a shelf or storage unit, an aisle or space 132 is created between a stationary storage unit, such as storage unit 106, and a mobile storage unit, such as storage unit 108a, by moving the mobile storage unit 108a relative to the stationary storage unit 107. A ladder, such as ladder 134a is slid into the aisle 132 along a pair of guide rails 138a and 138b that are fixed by a support structure 148, which is located above and separate from at least mobile storage unit 108a.

In another embodiment, a new or different aisle or space 132 is created to access or store items on a different storage unit by moving storage unit 108a relative to storage unit 108b to both create an aisle defined between storage unit 108a and 108b and simultaneously to eliminate the aisle defined between storage units 106 and 108a. It should be realized that in other embodiments and because both storage units 108a and 108b are mobile, to create aisle 132 defined between storage unit 108a and 108b, it may be that storage unit 108b is moved relative to storage unit 108a. Ladder 134b is slid into the new aisle 132 along a pair of different guide rails 140a and 140b that are also fixed by support structure 148.

In yet another embodiment, a new or different aisle or space 132 is created to access or store items on a different storage unit by moving storage unit 108b relative to storage unit 108c to both create an aisle defined between storage units 108b and 108c and simultaneously to eliminate the aisle defined between storage unit 108a and 108b. It should be realized that in other embodiments and because both storage units 108b and 108c are mobile, to create aisle 132 defined between storage units 108b and 108c, it may be that storage unit 108c is moved relative to storage unit 108b. Ladder 134c is slid into the new aisle 132 along a pair of different guide rails 142a and 142b that are also fixed by support structure 148.

In yet another embodiment, a new or different aisle or space 132 is created to access or store items on a different storage unit by moving storage unit 108c relative to storage unit 108d to both create an aisle defined between storage units 108c and 108d and simultaneously to eliminate the aisle defined between storage unit 108b and 108c. It should be realized that in other embodiments and because both storage units 108c and 108d are mobile, to create aisle 132 defined between storage units 108c and 108d, it may be that storage unit 108d is moved relative to storage unit 108c. Ladder 134d is slid into the new aisle 132 along a pair of different guide rails 144a and 144b that are also fixed by support structure 148.

In still another embodiment, a new or different aisle or space 132 is created to access or store items on a different storage unit by moving storage unit 108d relative to fixed or stationary storage unit 107 to both create an aisle defined between storage units 108d and 107 and simultaneously to eliminate the aisle defined between storage unit 108c and 108d. Ladder 134e is slid into the new aisle 132 along a pair of different guide rails 146a and 146b that are also fixed by support structure 148.

To slide ladders 134a-134e into a created aisle 132, each ladder is pulled from a stored position that is located in storage space 124 or from a stored position where each ladder is stored folded or collapsed and flat against a wall 136 that is located a distance from second ends 122 of each mobile storage unit 108a-108e. By pulling a ladder, the ladder opens to provide steps for climbing and, in one embodiment, slides along the guide rails. In another embodiment, the ladder also includes bottom wheels for pushing along the floor in combination with sliding along the guide rails.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A storage apparatus comprising:
   a plurality of shelves including a pair of fixed shelves and at least one mobile shelf, the at least one mobile shelf being located between the pair of fixed shelves;
   a selectively configured aisle to be located between two of the plurality of shelves; and
   a plurality of ladders having stored positions and accessing positions, wherein each ladder is engaged with and supported by a pair of fixed rails that span at least a length of each of the plurality of shelves, wherein each ladder in the stored position is located outside the selectively configured aisle and wherein each ladder in the accessing position is located in the selectively configured aisle; and
   wherein when one of the plurality of ladders is in the accessing position all remaining ladders of the plurality of ladders are in the stored position.

2. The storage apparatus of claim 1, wherein the at least one mobile shelf comprises a plurality of mobile shelves located between the pair of fixed shelves.

3. The storage apparatus of claim 2, wherein the selectively configured aisle is defined between one of the fixed shelves and one of the mobile shelves or between two of the plurality of mobile shelves.

4. The storage apparatus of claim 1, wherein each of the plurality of shelves includes a length that is oriented along a longitudinal direction and wherein the at least one mobile shelf is moveable in a lateral direction substantially perpendicular to the longitudinal direction for selectively configuring each aisle.

5. The storage apparatus of claim 4, wherein the pair of fixed rails extend along the longitudinal direction and are supported by a support structure located above and separate from the at least one mobile shelf.

6. The storage apparatus of claim 5, wherein the support structure located above and separate from the at least one mobile shelf further comprises a plurality of support members that are oriented substantially perpendicularly to the pair of fixed rails.

7. A storage apparatus comprising:
a plurality of storage units having lengths oriented along a longitudinal direction and including a pair of outer storage units and at least one inner storage unit located between the pair of outer storage units, wherein the at least one inner storage unit is moveable relative to each outer storage unit so that one of a plurality of selectively creatable aisles is located between the pair of outer storage units and selectively defined between two of the plurality of storage units; and
a plurality of ladders each slidably engaged with a pair of guide rails that are fixed to a support structure located above and separate from the at least one inner storage unit, each ladder having a stored position where the ladder is spaced apart from the outer and inner storage units and each ladder having a use position where the ladder is located inside the one of the plurality of selectively creatable aisles, wherein when one of the plurality of ladders is in the use position the remaining of the plurality of ladders are in the stored position.

8. The storage apparatus of claim 7, wherein each pair of guide rails have lengths that are oriented along the longitudinal direction so that each ladder is slid along the pair of guide rails in the longitudinal direction into the use position.

9. The storage apparatus of claim 8, wherein a bottom of the at least one inner storage unit is attached to a plurality of tracks that are substantially oriented in the lateral direction so that the at least one inner storage unit is moveable in the lateral direction.

10. The storage apparatus of claim 7, wherein the pair of outer storage units comprises stationary storage units.

11. The storage apparatus of claim 7, wherein the at least one inner storage unit comprises an end that is spaced apart from a wall by a distance.

12. The storage apparatus of claim 11, wherein in the stored position each ladder is located between the wall and the end of the at least one inner storage unit.

13. The storage apparatus of claim 7, wherein the plurality of storage units comprise a plurality of shelves for holding inventory.

14. A storage apparatus comprising:
a plurality of storage units including a pair of spaced apart stationary storage units and a plurality of mobile storage units located between the pair of stationary storage units, wherein each mobile storage unit is moveable relative to the pair of stationary storage units so one of a plurality of selectively creatable aisles is located between the pair of stationary storage units and selectively defined between two of the plurality of storage units; and
a plurality of ladders having stored positions that are located outside the plurality of selectively created aisles and having use positions that are located in one of the plurality of selectively creatable aisles, each ladder is slidably coupled to a pair of guide rails that are fixed to a support structure located above and separate from the plurality of mobile storage units; and
wherein a total number of the plurality of ladders equals a total number of the plurality of selectively creatable aisles.

15. The storage apparatus of claim 14, wherein each stored position of each of the plurality of ladders is located in a space formed between a wall and an end of each mobile storage unit.

16. The storage apparatus of claim 15, wherein each ladder is located flat against the wall when each ladder is in the stored position.

* * * * *